(12) United States Patent
Horino

(10) Patent No.: US 8,180,315 B2
(45) Date of Patent: May 15, 2012

(54) MOBILE TERMINAL AND FUNCTIONAL OPERATION CONTROL METHOD OF THE SAME

(75) Inventor: Yoshifumi Horino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 208 days.

(21) Appl. No.: 12/294,871

(22) PCT Filed: Mar. 22, 2007

(86) PCT No.: PCT/JP2007/055854
§ 371 (c)(1),
(2), (4) Date: Jun. 7, 2010

(87) PCT Pub. No.: WO2007/114066
PCT Pub. Date: Oct. 11, 2007

(65) Prior Publication Data
US 2010/0240419 A1 Sep. 23, 2010

(30) Foreign Application Priority Data

Mar. 28, 2006 (JP) ................................ P2006-086784
Jul. 27, 2006 (JP) ................................ P2006-205049

(51) Int. Cl.
*H04B 1/16* (2006.01)
(52) U.S. Cl. .................... 455/343.1; 455/572; 455/127.3
(58) Field of Classification Search .... 455/343.1–343.5, 455/572–574, 127.1–127.5
See application file for complete search history.

(56) References Cited

U.S. PATENT DOCUMENTS

| 5,858,570 | A | * | 1/1999 | Akagi | 429/50 |
| 6,501,968 | B1 | | 12/2002 | Ichimura | 455/574 |
| 6,564,051 | B2 | * | 5/2003 | Struhsaker et al. | 455/423 |
| 6,898,446 | B2 | * | 5/2005 | Muto | 455/574 |
| 7,680,479 | B2 | * | 3/2010 | Nishida | 455/343.6 |
| 2003/0224833 | A1 | * | 12/2003 | Egan et al. | 455/572 |
| 2009/0093279 | A1 | * | 4/2009 | Matsuura | 455/574 |
| 2010/0137023 | A1 | * | 6/2010 | Chishima et al. | 455/552.1 |

FOREIGN PATENT DOCUMENTS

| JP | 08098415 A | 4/1996 |
| JP | 09115554 A | 5/1997 |
| JP | 10-304578 | 11/1998 |
| JP | 2000349873 A | 12/2000 |

(Continued)

OTHER PUBLICATIONS

Korean language office action dated Aug. 9, 2010 and its English language translation for corresponding Korean application 20087025931 lists the references above.

(Continued)

*Primary Examiner* — Lana N Le
(74) *Attorney, Agent, or Firm* — DLA Piper LLP (US)

(57) ABSTRACT

A mobile terminal includes: a battery supplying electric power; a voltage detection portion which detects the voltage of the battery; a function activation control portion which activates a predetermined function at a preset time; and a warning portion which, in reference to a predicted battery voltage at the preset time calculated by subtracting a predicted value of reduced voltage based on a consumed current until the preset time from a detected voltage detected by the voltage detection portion, raises a warning if the predicted battery voltage is smaller than the minimum voltage that is necessary for activating the predetermined function by the function activation control portion.

12 Claims, 3 Drawing Sheets

FOREIGN PATENT DOCUMENTS

| | | |
|---|---|---|
| JP | 2002-062955 | 2/2002 |
| JP | 2002-077377 | 3/2002 |
| JP | 2002-261919 | 9/2002 |
| JP | 2004-219395 | 8/2004 |

OTHER PUBLICATIONS

Chinese language office action dated Sep. 6, 2010 and its English language translation for corresponding Chinese application 200780010921.4 lists the references above.

Korean language office action (notice of result of mandatory reexamination) dated Apr. 27, 2011 and its English language translation for corresponding Korean application 1020087025931.

Korean language trial board's decision dated Sep. 29, 2011 and its English language translation for corresponding Korean application 1020087025931.

Chinese language office action dated Feb. 2, 2012 and its English language translation issued in corresponding Chinese application 200780010921.4.

* cited by examiner

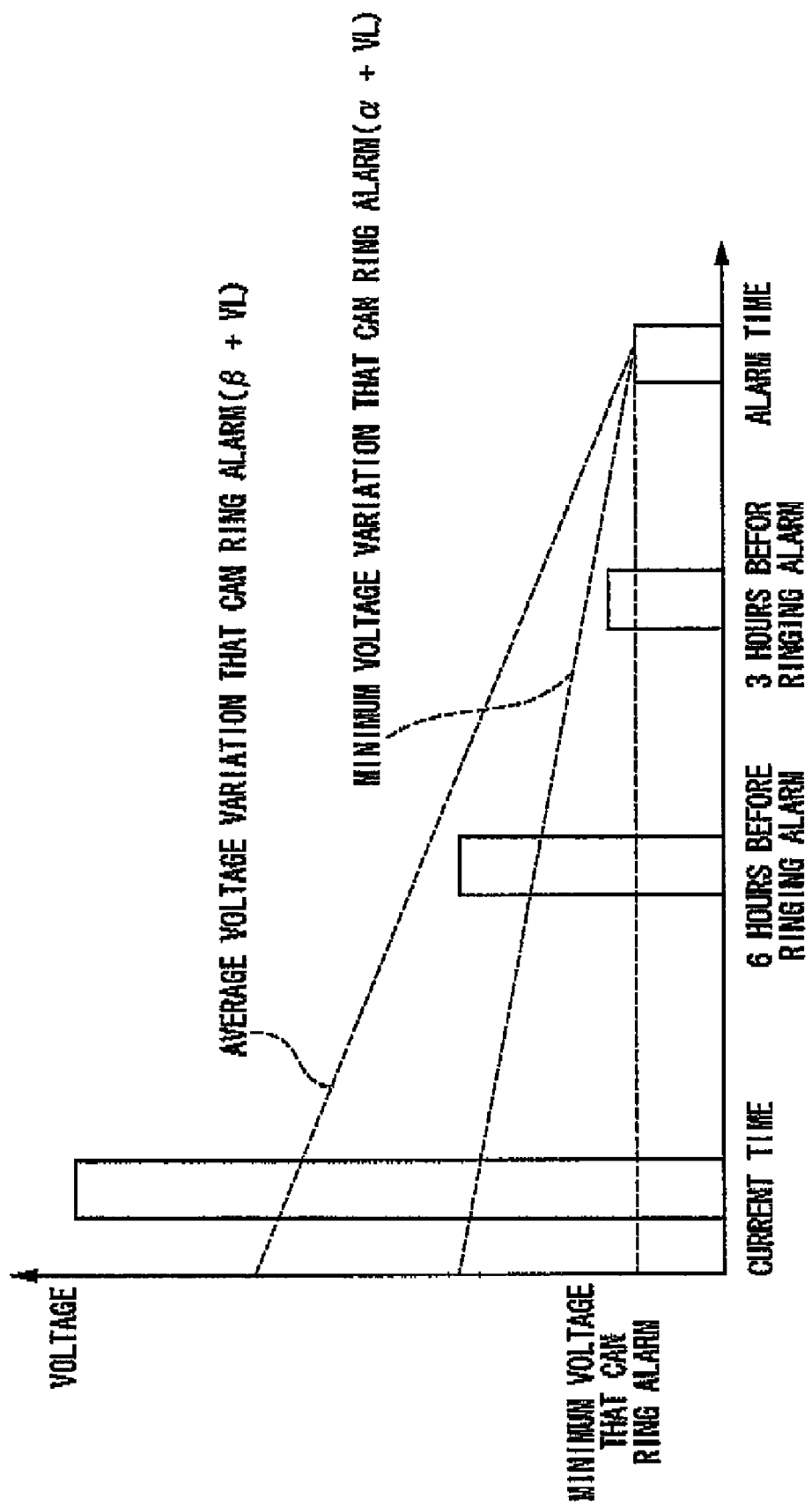

MOBILE TERMINAL AND FUNCTIONAL OPERATION CONTROL METHOD OF THE SAME

TECHNICAL FIELD

The present invention relates to a mobile terminal and a functional operation control method of the mobile terminal that can reliably conduct predetermined functions after a predetermined time.

Priority is claimed on Japanese Patent Applications No. 2006-86784, filed Mar. 28, 2006 and No. 2006-205049, filed Jul. 27, 2006, the content of which is incorporated herein by reference.

BACKGROUND ART

In the past and present, in addition to the minimal voice communication function of a case of a lowered ability of a battery to supply power, in order to keep non-vocal communication functions available while keeping other functions available, a mobile communication terminal is generally known which detects a lowered ability of a battery to supply power and which is controlled so as to restrict communication functions when a lowered ability of a battery to supply power is detected (for example, see Patent Document 1). By applying such a restriction control, for example, when a lowered ability of a battery to supply power is detected, a limitation of a communication time of voice communication is conducted so as to be a predetermined time or shorter, all voice communications are suspended except for detection of an incoming call, at least one or all of a data transmission function, a data reception function and a data transmission/reception function other than voice communication or other than voice larger than a certain level. In addition, by applying such a restriction control, for example, priority is assigned to each communication operation, if the priority is higher than a predetermined level, an ability of a battery to supply power is detected and the limitation of the communication is temporally, canceled even though the communication is limited.

[Patent Document 1] Japanese Patent Application, First Publication No. 2002-261919.

DISCLOSURE OF INVENTION

However, in the mobile terminal shown in Patent Document 1, there is a problem in which it is not possible to activate a necessary function when the function is wanted because a portion of the functions are kept available while other functions are restricted or limited when the ability of a battery to supply power is low. In particular, in a case of activating an alarm function after a predetermined time by using a timer, there is a possibility in which the ability of a battery to supply power is deteriorated or fluctuates before the predetermined time, hence there is a problem in which the functions are restricted and it is not possible to ring the alarm even though the alarm is necessary.

The present invention was conceived in order to solve such problems and has an object to provide a mobile terminal and a control method of functions and operations of the mobile terminal that can reliably activate a predetermined function after a predetermined time.

The present invention is characterized by including: a battery supplying electric power; a voltage detection portion which detects a voltage of the battery; a function activation control portion which activates a predetermined function at a preset time; and a warning portion which, in reference to a predicted battery voltage at the preset time calculated by subtracting a predicted value of reduced voltage based on a consumed current until the preset time from a detected voltage detected by the voltage detection portion, raises a warning if the predicted battery voltage is smaller than the minimum voltage that is necessary for activating the predetermined function by the function activation control portion.

The present invention is characterized by amount of the consumed current necessary for detecting an elapsed time until the preset time.

The present invention is characterized by the warning that indicates a necessity of charge.

The present invention is characterized by the predetermined function which includes at least one of functions of ringing an alarm at the preset time, sending an e-mail at the preset time and downloading data at the preset time.

The present invention is characterized by including: a battery supplying electric power; a voltage detection portion which detects a voltage of the battery; a function activation control portion which activates a predetermined function at a preset time; and a function activation restriction portion which, in reference to a predicted battery voltage at the preset time calculated by subtracting a predicted value of reduced voltage based on a consumed current which is necessary for activating currently used functions until the preset time from a detected voltage detected by the voltage detection portion, if the predicted battery voltage is smaller than the minimum voltage that is necessary for activating the predetermined function by the function activation control portion, only a function of detecting an elapsed time until the preset time is activated while restricting activation of other functions until the preset time.

The present invention is characterized by a point that the consumed current is an average value calculated based on state or amount used in the past.

The present invention is characterized by the other functions which include a communication function, a backlight function and a vibration function.

The present invention is characterized by said currently used functions which include at least one of a voice/sound recording or playing function, an image recording or playing function, a TV function and a game function.

The present invention is characterized by the predetermined function which includes at least one of functions of ringing an alarm at the preset time, sending an e-mail at the preset time and downloading data at the preset time.

The present invention is a functional operation control method of a mobile terminal which activates a predetermined function at a preset time characterized by including: a step of detecting the voltage of the battery; a step of calculating a consumed current until the preset time; a step of calculating a predicted value of reduced voltage based on the consumed current until the preset time; a step of calculating a predicted battery voltage at the preset time by subtracting the predicted value of reduced voltage from the detected voltage; a step of raising a warning if the predicted battery voltage is smaller than the minimum voltage that is necessary for activating the predetermined function by the function activation control portion.

The present invention is a functional operation control method of a mobile terminal which activates a predetermined function at a preset time characterized by including: a step of detecting the voltage of the battery; a step of calculating a consumed current until the preset time; a step of calculating a predicted value of reduced voltage based on the consumed current until the preset time; a step of calculating a predicted battery voltage at the preset time by subtracting the predicted value of reduced voltage from the detected voltage; a step of activating only a function of detecting an elapsed time until the preset time while restricting activation of other functions until the preset time if the predicted battery voltage is smaller than the minimum voltage that is necessary for activating the predetermined function by the function activation control portion.

The present invention is characterized by said other functions which include a communication function, a backlight function and a vibration function.

In accordance with the present invention, the mobile terminal gives an alarm if a predicted battery voltage of a preset time is lower than the minimum voltage which is necessary for activating predetermined functions, and here, the predicted voltage is obtained by subtracting a predicted reduction of the voltage calculated based on a consumed current until, the predetermined time from a voltage of the battery detected by a voltage detection portion. Therefore, the user can charge the battery if the alarm is given, and it is possible to have an advantageous point that can reliably activate a predetermined function after a predetermined time or at a predetermined time.

In addition, if a predicted battery voltage of a preset time is lower than the minimum voltage which is necessary for activating predetermined functions while the predicted voltage is obtained by subtracting a predicted reduction of the voltage calculated based on a consumed current until the predetermined, time from a voltage of the battery detected by a voltage detection portion, only a function for detecting the predetermined time is activated and operations of other functions are limited or restricted until the predetermined time, hence, it is possible to lower the power consumption, and it is possible to have an advantageous point that can reliably activate a predetermined function after a predetermined time or at a predetermined time.

BRIEF DESCRIPTION OF TIM DRAWINGS

FIG. 3 is a drawing that explains time changes of a voltage reduction α13 and a voltage reduction β14 shown in FIG. 1.

DESCRIPTION OF THE REFERENCE SYMBOLS

Figure 1:
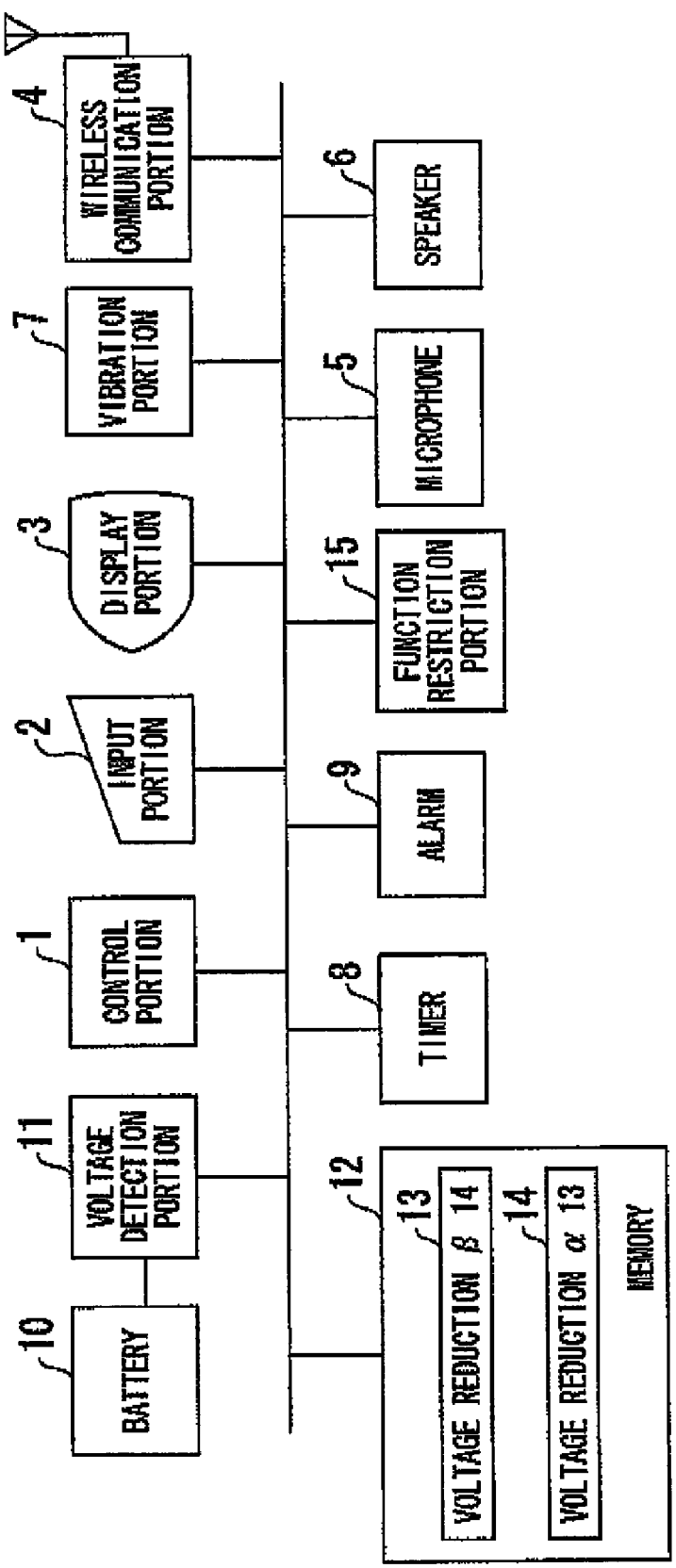
FIG. 1 is a block diagram showing a constitution of one embodiment of the present invention.

1 . . . control portion
2 . . . input portion
3 . . . display portion
4 . . . wireless communication portion
5 . . . microphone
6 . . . speaker
7 . . . vibration portion
8 . . . timer
9 . . . alarm
10 . . . battery
11 . . . voltage detection portion
12 . . . memory
15 . . . function restriction portion

BEST MODE FOR CARRYING OUT THE INVENTION

Hereinafter, in reference to the drawings, a mobile terminal of one embodiment of the present invention is explained. FIG. 1 is a block diagram showing a constitution of the embodiment. In FIG. 1, reference numeral 1 is a control portion which integrally controls operations of the mobile terminal. Reference numeral 2 is an input portion which is constituted from, for example, a key panel on which dialing keys and function keys are arranged. Reference numeral 3 is a display portion which is constituted from, for example, a liquid crystal display. Reference numeral 4 is a wireless communication portion which establishes wireless communication to a base station that is not shown in the drawings, and conducts a voice communication and a data communication. Reference numeral 5 is a microphone which collects the voice of the user. Reference numeral 6 is a speaker which sounds the voice of an intended party. Reference numeral 7 is a vibration portion which notifies an incoming call by vibration. Reference numeral 8 is a timer which outputs time information. Reference numeral 9 is en alarm portion which gives an alarm by generating, for example, sound and light at a predetermined time.

Reference numeral 10 is a battery (secondary battery) which provides the electric power for activating the mobile terminal. Reference numeral 11 is a voltage detection portion which detects the voltage of the battery 10. Reference numeral 12 is a memory which stores both a voltage reduction α 13 and a voltage reduction β 14 which are thresholds for conducting control of functions and operations. Other than the voltage reduction, the memory 12 stores data obtained by the user, a computer program which is executed on the mobile terminal, and the like. Reference numeral 15 is a function restriction portion which restricts activation of functions of the mobile terminal based on the ability of supplying power from the battery.

In the explanation below, a function that raises an alarm at a preset time is explained as an example of a predetermined function which is activated at the predetermined time.

Here, in reference to FIG. 3, the voltage reductions α 13 and β 14 stored in the memory 12 are explained. The minimum voltage that can ring the alarm as shown in FIG. 3 is the necessary voltage at the minimum level for ringing the alarm (hereinafter, voltage VL) that is calculated beforehand and stored inside.

A minimum voltage variation (reduced voltage α) for ringing the alarm is a variation of the voltage of the battery 10 (line which shows a relationship between the voltage of the battery and elapsed time) which is reduced until a voltage VL that is the minimum and necessary voltage for ringing the alarm at a preset time in a condition in which only a function that detects the preset time for ringing the alarm is activated without activating other functions (for example, voice communication, backlight function and vibration function) of the mobile terminal until the preset time. The reduced voltage α is the reduced voltage (predicted value of reduced voltage) of the battery stored in the memory 12 beforehand corresponding to time remained until the preset time of ringing the alarm in a case of activating only a detection operation of the preset time of ringing the alarm. For example, in a case of conducting only an operation of detecting the preset time when the alarm is ring, if the remained time is 6 hours, the reduced voltage of the battery (reduced voltage α) corresponding to the remained time of 6 hours is subtracted from the current battery voltage, hence, it is possible to predict the battery voltage (the predicted battery voltage) after 6 hours.

In addition, by saving information of consumed current history at times in the past, based on the an average consumed current of the time in the past, average voltage variation (reduced voltage β) that can ring the alarm is a variation of the voltage of the battery 10 (line which shows the relationship between the voltage of the battery and elapsed time) which is reduced until a voltage VL that is the minimum and necessary voltage for ringing the alarm at a preset time. The reduced voltage β is the reduced voltage (predicted value of reduced voltage) of the battery stored in the memory 12 beforehand corresponding to time remaining until the preset time of ringing the alarm in a case of normally using the mobile terminal. For example, in a case of normally using the mobile terminal, if the remaining time is 3 hours, the reduced voltage of the battery (reduced voltage β) corresponding to the remaining time of 3 hours is subtracted from the current battery voltage, hence, it is possible to predict the battery voltage (the predicted battery voltage) after 3 hours. Here, functions of the mobile terminal which are normally used include functions of recording and playing the voice or the music, recording and playing images, watching TV program, playing a game, and the like.

Next, in reference to FIG. 3, an outline of the operation is explained. The battery voltage detection portion 11 detects a current voltage of the battery 10 (hereinafter, VB) if the alarm is set to ring at a predetermined time, and if the voltage VB is larger than "reduced voltage β+voltage VL", the battery voltage detection portion 11 determines that the necessary voltage can be maintained until the time of ringing the alarm and does not conduct any special operations. Next, for example, in case of "(reduced voltage β+voltage VL)>voltage VB>(reduced voltage α+voltage VL)" at a time 6 hours before ringing the alarm, it is determined that there is a possibility in which the voltage VB is lower than the voltage VL at the time the alarm is ring, hence, a function that detects the preset time for ringing the alarm is controlled to be activated without activating other functions (for example, voice communication, communication functions such as sending e-mail, backlight function and vibration function) of the mobile terminal until the preset time or a warning is raised that notifies a possibility in which the alarm will not be ring at the preset time. In addition, for example, in case of "(reduced voltage α+voltage VL)>voltage VB" at a time 3 hours before ringing the alarm, it is determined that the voltage VB should be lower than the voltage VL at the time the alarm is ring, and a warning is raised that notifies the user to charge.

Figure 2:
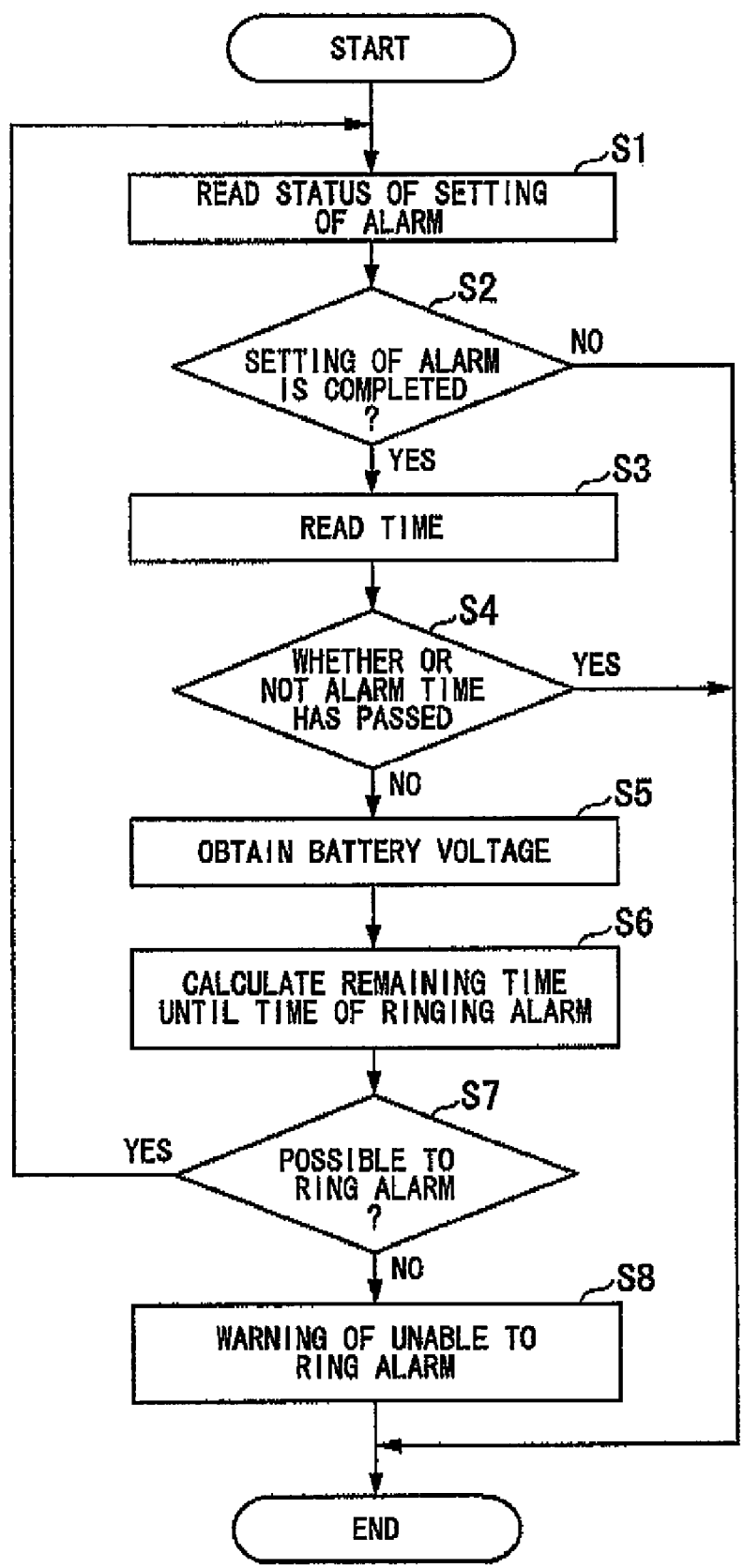
FIG. 2 is a flowchart showing the operation of an apparatus described in FIG. 1.

Next, in reference to FIG. 2, an operation of the mobile terminal 1 shown in FIG. 1 is explained in detail. At the beginning, an operation of setting the alarm to ring at a preset time. First, the user operates the input portion 2 and selects a menu for an alarm setting. In accordance with this operation, the control portion 1 controls the display portion 3 to show a message for prompting the user to input a time at which the alarm is ring. Here, the user input the time (for example, 07:00) at which the alarm is ring by operating the input portion 2. The control portion 1 reads the time at which the alarm is ring that was input via the input portion 2 and notifies the alarm generation portion 9 of the time. The alarm generation portion 9 receives the time at which the alarm is ring and stores the time inside. After this, the control portion 1 controls the display portion 3 to show a message of end of setting the alarm to ring. In accordance with such operations, an operation of setting the alarm to ring is conducted.

Next, a control operation in a state after setting the alarm is explained. First, the control portion 1 reads status of the setting of the alarm that is stored inside the alarm generation portion 9 (Step S1). After this, the control portion 1 finishes operations if the setting of the alarm is not completed yet (Step S2). On the other hand, the control portion 1 reads the =Tent time from the tinier 8 if the setting of the alarm is completed (Step S3). The control portion 1 compares the read time to the preset time of ringing the alarm in order to determine whether or not the alarm time has passed (Step S4). Based on the determination, the control portion 1 finishes the operation if the alarm time has passed.

On the other hand, if the setting of the alarm is completed, and the alarm time is not passed, the control portion 1 obtains the current battery voltage VB of the battery 10 from the voltage detection portion 11 (Step S5). The control portion 1 calculates the remaining time until the time of ringing the alarm based on the current time read from the timer 8 and the preset time of ringing the alarm (Step S6). After this, the control portion 1 determines whether or not it is possible to ring the alarm at the preset time based on both the remaining time until the time of ringing the alarm and the current battery voltage VB (Step S7).

This determination operation is conducted, after reading the voltage reductions α 13 and β 14 which correspond to the remaining time until the time of ringing the alarm from the memory 12, based on a determination result whether or not the voltage VB is larger than "reduced voltage β+voltage VL". If the voltage VB is larger than "reduced voltage β+voltage VL", it is determined that the necessary voltage can be maintained until the time of ringing the alarm and the operation returns to Step S1 without conducting any special operations.

In addition, it is checked whether or not the voltage VB satisfies "(reduced voltage β+voltage VL)>voltage VB>(reduced voltage α+voltage VL)", and if "(reduced voltage β+voltage VL)>voltage VB>(reduced voltage α+voltage VL)" is satisfied, it ads determined that there is a possibility in which the voltage VB is lower than the voltage VL, at the time the alarm is ring, hence, the control portion 1 gives a command to the function restriction portion 15 so as to activate only a function that detects the preset time for ringing the alarm without activating other functions of the mobile terminal until the preset time, and controls the display portion 3 to show a warning that notifies a possibility in which the alarm will not be ring at the preset time. The function restriction portion 15 receives the command from the control portion 1 and conducts a control operation so as to activate only a function that detects the preset time for ringing the alarm without activating other functions of the mobile terminal until the preset time. After this, the control portion 1 returns the operation to Step S1.

In addition, it is checked whether or not the voltage VB satisfies "(reduced voltage α+voltage VL)>voltage VB", and if the voltage VB satisfies "(reduced voltage α+voltage VL)>voltage VB", it is determined that the voltage VB should be lower than the voltage VL at the time the alarm is ring, and a warning is raised that notifies the user to charge on the display portion 3 (Step S8).

It should be noted that the operation shown in FIG. 2 is reset when the battery 10 is charged, and the operation is repeated from Step S1.

As described above, the battery voltage at the preset time is predicted based on the current consumed until the preset time, and a warning is raised if the predicted voltage is smaller than the minimum voltage necessary for activating the function of ringing the alarm, hence, the user can charge the battery based on the warning, and it is possible to reliably activate the function of ringing the alarm. In addition, activation of other functions is restricted if the mobile terminal is used more often than a regular time, hence, it is possible to lower the power consumption, and it is possible to reliably activate the function of ringing the alarm at the preset time.

It should be noted that in the above description, the function of ringing the alarm is explained as an example. However, other than the function of ringing the alarm, it is possible to apply the function of reliable activation at the preset time to various functions such as a function of sending e-mail at the preset time and a function of downloading data at the preset time. In other words, it is possible to apply to any functions that conduct predetermined operations at the preset time or after a predetermined time by using the timer. In such cases, it is possible to measure the voltage VL and the voltage reductions α 13 and β 14 that are necessary for activating the function with regard to each of the functions beforehand and save these values in the memory 12.

It should be noted that the mobile terminal of the present invention includes such as a cellular phone which uses a mobile communication function, a personal digital assistant (FDA), a mobile terminal, a car navigation apparatus.

It should be noted that, it is possible to store the program which realizes functions of operation portions shown in FIG. 1 in a computer-readable medium, and it is possible to execute control operations of activating functions after reading the program stored in the medium by a computer system. It should be noted that the "compute system" here preferably includes an OS and hardware such as peripheral equipment, and the like. Moreover, the "computer-readable medium" is a storage device, that is, for example, a flexible disc, a magneto-optical disc, ROM, a portable medium such as a CD-ROM, and a storage device such as a hard disc installed in the computer system. Moreover, the "computer-readable medium" includes a medium which maintains the program for a certain time, that is, for example, a volatile memory (RAM) inside the computer system which is a server or a client from which or to which the program is transmitted via a network such as the Internet or via a communication line such as a telephone line.

Moreover, it is possible to transmit the above-described program to another computer system via a communication medium or via a transmission wave included in the transmission medium, from the computer system in which the program is stored in the storage device. Here, the "transmission medium" for transmitting the program is a medium which has a function to transmit the information or data, that is, for example, a network (communication network) such as the Internet and a communication line (lines for communication) such as a telephone line. Moreover, it is possible that the above-described program be provided for realizing a portion of the above-described functions. Moreover, it is possible that the above-described program be a program which can realize the above-described functions by combining with or being linked to other programs which have been stored in the computer system beforehand, that is, it is possible that the above-described program be a so-called differential file (differential program).

Industrial Applicability

A mobile terminal and a functional operation control method of the mobile terminal are provided by which the user can charge the battery if the alarm is given and which can reliably activate a predetermined function after a predetermined time or at a predetermined time.

The invention claimed is:

1. A mobile terminal comprising:
   a battery supplying electric power;
   a voltage detection portion which detects a voltage of the battery;
   a function activation control portion which activates a predetermined function at a preset time; and
   a warning portion which, in reference to a predicted battery voltage at the preset time calculated by subtracting a predicted value of reduced voltage based on a consumed current until the preset time from a detected voltage detected by the voltage detection portion, raises a warning if the predicted battery voltage is smaller than a minimum voltage that is necessary for activating the predetermined function by the function activation control portion.

2. A mobile terminal according to claim 1, wherein the consumed current is necessary for detecting an elapsed time until the preset time.

3. A mobile terminal according to claim 1, wherein the warning indicates a necessity of charging.

4. A mobile terminal according to claim 1, wherein the predetermined function includes at least one of functions of ringing an alarm at the preset time, sending an e-mail at the preset time and downloading data at the preset time.

5. A mobile terminal comprising:
   a battery supplying electric power;
   a voltage detection portion which detects a voltage of the battery;
   a function activation control portion which activates a predetermined function at a preset time; and
   a function activation restriction portion which, in reference to a predicted battery voltage at the preset time calculated by subtracting a predicted value of reduced voltage based on a consumed current which is necessary for activating currently used functions until the preset time from a detected voltage detected by the voltage detection portion, if the predicted battery voltage is smaller than a minimum voltage that is necessary for activating the predetermined function by the function activation control portion, only a function of detecting an elapsed time until the preset time is activated while restricting activation of other functions until the preset time.

6. A mobile terminal according to claim 5, wherein the consumed current is an average value calculated based on usage state in the past.

7. A mobile terminal according to claim 6, wherein said other functions include a communication function, a backlight function and a vibration function.

8. A mobile terminal according to claim 6, wherein said currently used functions include at least one of a voice/sound recording or playing function, an image recording or playing function, a TV function and a game function.

9. A mobile terminal according to claim 6, wherein the predetermined function includes at least one of functions of ringing an alarm at the preset time, sending e-mail at the preset time and downloading data at the preset time.

10. A functional operation control method of a mobile terminal which activates a predetermined function at a preset time comprising:
    a step of detecting a voltage of the battery;
    a step of calculating a consumed current until the preset time;
    a step of calculating a predicted value of reduced voltage based on the consumed current until the preset time;
    a step of calculating a predicted battery voltage at the preset time by subtracting the predicted value of reduced voltage from the detected voltage; and
    a step of raising a warning if the predicted battery voltage is smaller than a minimum voltage that is necessary for activating the predetermined function by the function activation control portion.

11. A functional operation control method of a mobile terminal which activates a predetermined function at a preset time comprising:
- a step of detecting a voltage of the battery;
- a step of calculating a consumed current until the preset time;
- a step of calculating a predicted value of reduced voltage based on the consumed current until the preset time;
- a step of calculating a predicted battery voltage at the preset time by subtracting the predicted value of reduced voltage from the detected voltage; and
- a step of activating only a function of detecting an elapsed time until the preset time while restricting activation of other functions until the preset time if the predicted battery voltage is smaller than a minimum voltage that is necessary for activating the predetermined function by the function activation control portion.

12. A functional operation control method of a mobile terminal according to claim 11, wherein said other functions include a communication function, a backlight function and a vibration function.

* * * * *